Patented Dec. 26, 1950

2,535,934

UNITED STATES PATENT OFFICE 2,535,934

SULFANILYL PIPERAZINES AND METHOD OF PREPARING SAME

Samuel Kushner, Nanuet, and Victor K. Smith, Jr., Pearl River, N. Y., assignors to American Cyanamid Company, New York, N. Y., a corporation of Maine No Drawing. Application March 30, 1949, Serial No. 84,476

6 Claims. (Cl. 260—239.7)

1

The present invention relates to new organic compounds. More particularly, it relates to sulfanilyl piperazines and to a method of preparing the same.

The new compounds of the present invention have the following general formula:

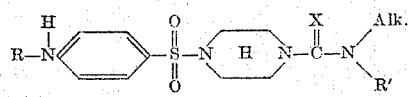

in which R is hydrogen or an acyl radical, X is oxygen or a sulphur radical, R' is hydrogen or a lower alkyl radical and Alk. is a lower alkyl radical.

In general, the compounds prepared by the present invention are crystalline solids, slightly soluble in water and soluble in most organic solvents. In the form of their acid salts they are white solids.

We prefer to prepare the compounds of the present invention by reacting a carbamyl or thiocarbamyl piperazine with an acyl sulfanilyl halide. The reaction is preferably carried out within the temperature range of about 0° C. to about 30° C., preferably in a solvent such as chloroform, acetone, carbon tetrachloride, ethyl acetate, water, etc.

The carbamyl and thiocarbamyl piperazines used as intermediates in the present reaction can be prepared by reacting a carbamyl or thiocarbamyl halide with piperazine or a hydrate thereof. Intermediates such as diethylcarbamyl piperazine, dimethylcarbamyl piperazine, dipropylcarbamyl piperazine, dibutylcarbamyl piperazine, monoethylcarbamyl piperazine, monomethylcarbamyl piperazine, diethylthiocarbamyl piperazine, dimethylthiocarbamyl piperazine, dipropylthiocarbamyl piperazine, dibutylthiocarbamyl piperazine, monomethylthiocarbamyl piperazine and the like can be used in carrying out the process of the present invention.

As regards the other intermediate in the present invention, namely, acylsulfanilyl halogens, we can use acetylsulfanilyl chloride, acetylsulfanilyl bromide, propionylsulfanilyl chloride, propionylsulfanilyl bromide, butyrylsulfanilyl chloride, butyrylsulfanilyl bromide, and the like.

The reaction of the present invention can be carried out within from 10 minutes to about one hour, however, the preferred reaction time is from 20 to about 40 minutes.

The compounds of the present invention are useful for therapeutic purposes in the treatment of pathogenic infections.

2

The present invention will now be illustrated in greater detail by means of the following specific examples in which representative sulfanilyl piperazines are prepared.

Example 1

To 99 gms. (1 mole) of 1-diethylcarbamylpiperazine in a 2 liter, 3-necked, round bottomed flask fitted with a mechanical stirrer, two dropping funnels, and a cooling bath is added 250 ml. of water and 250 ml. of acetone. The mixing is begun, and the contents of the flask are cooled to 0°–5° C. Then 21.4 gms. (1 mole) of sodium hydroxide is dissolved in 400 ml. of water, and 124 gms. (1 mole) of N-acetylsulfanilyl chloride is dissolved in 400 ml. of acetone. These two latter solutions are cooled and then added dropwise and simultaneously into the 2 liter flask through the two dropping funnels. During this addition adequate stirring is maintained, and the temperature is maintained at 0°–5° C. by means of the cooling bath. The time of addition is 30 to 60 minutes. Stirring is maintained for 20 to 30 minutes longer, after which the crystalline 1-diethylcarbamyl-4-(N⁴-acetylsulfanilyl)-piperazine is removed by suction filtration.

Example 2

The 1-diethylcarbamyl-4-(N⁴-acetylsulfanilyl)-piperazine, prepared in Example 1, is dissolved in 1250 ml. of 2 N hydrochloric acid by warming on the steam bath with stirring. When complete solution takes place the compound is hydrolyzed. The solution is cooled and filtered. An excess of alkali is added and the product is extracted several times with chloroform. The chloroform extracts are combined, dried with anhydrous magnesium sulfate, clarified with activated charcoal, filtered and concentrated under reduced pressure. The crystalline 1-diethylcarbamyl-4-sulfanilylpiperazine precipitates from the cooled concentrate and when dried, the compound has a melting point of 131.5°–132° C. (uncorrected).

Example 3

To 21.75 g. (1 mole) of oily 1-diethylthiocarbamyl piperazine hydrochloride dissolved in water in a 2 liter flask is added 3.67 g. of sodium hydroxide previously dissolved in water. The sodium hydroxide solution is added while stirring and cooling the original solution. Then 100 ml. of acetone is added. To the reaction mixture is then added simultaneously a solution of 3.67 g. of sodium hydroxide in water and 21.34 g. (1 mole)

of acetylsulfanilyl chloride dissolved in 100 ml. of acetone over a period of 30 to 40 minutes. The reaction mixture is stirred vigorously and kept at about 5° C. The product is then extracted from the mixture with butanol from which it then crystallizes. The product is recrystallized from a mixture of acetone and water. On analysis for carbon, hydrogen, nitrogen and sulfur the values obtained agreed very closely with the theoretical values for 1-diethylthiocarbamyl-4-(N⁴-acetylsulfanilyl)piperazine. The product has a melting point of 170°–171.5° C. (uncorrected).

*Example 4*

To 250 ml. of 1:4 aqueous hydrochloric acid is added 5 g. of 1-diethylthiocarbamyl-4-(N⁴-acetylsulfanilyl)piperazine (as prepared in Example 3) and the mixture boiled for 20 to 30 minutes until virtually all solids are in solution. The reaction mixture is then cooled to 5° C. and filtered. The filtrate is transferred to a separatory funnel and ice and excess of sodium hydroxide added. The mixture is then extracted three times with chloroform. The extracts are combined, treated with activated charcoal and anhydrous magnesium sulfate and filtered. The filtrate is then concentrated under reduced pressure to a small volume. Petroleum ether is added and the solution cooled. The resulting crystals are filtered and washed with a mixture of chloroform and petroleum ether. The 1-diethylthiocarbamyl-4-sulfanilylpiperazine is recrystallized several times from butanol, and then from ethyl acetate. This product should be carefully dried in a vacuum oven or equivalent since the product tends to have some solvent with crystals. The product has a melting point of 135.5°–137.5° C., (uncorrected).

The invention is also concerned with salts of the compounds prepared above, such as the hydrochloride or sulfate, which can be prepared in the conventional manner.

We claim:

1. Compounds of the group consisting of those having the general formula:

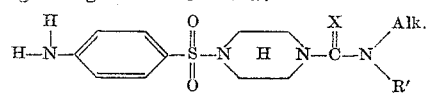

in which X is a member of the group consisting of oxygen and sulfur radicals, R' is a member of the group consisting of hydrogen and lower alkyl radicals and Alk. is a lower alkyl radical, and acid salts thereof.

2. 1-diethylcarbamyl-4-sulfanilyl piperazine.

3. 1-diethylthiocarbamyl-4-sulfanilyl piperazine.

4. A method of preparing sulfanilylpiperazines having the general formula:

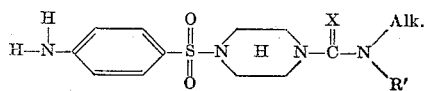

in which X is a member of the group consisting of oxygen and sulfur radicals, R' is a member of the group consisting of hydrogen and lower alkyl radicals and Alk. is a lower alkyl radical, which comprises admixing a compound having the formula:

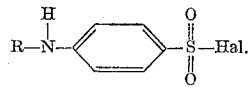

in which R is an acyl radical of the lower fatty acid series and Hal. is halogen with a compound having the formula:

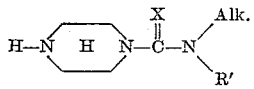

in which X, R' and Alk. are as defined above at a temperature within the range 0° C. to 30° C. in the presence of a solvent and thereafter hydrolyzing the resulting product and recovering said sulfanilylpiperazine.

5. A method of preparing 1-diethylcarbamyl-4-sulfanilylpiperazine which comprises admixing N-acetylsulfanilyl chloride with 1-diethylcarbamylpiperazine at a temperature within the range 0° C. to 30° C. in an aqueous acetone solvent and thereafter hydrolyzing the product and recovering said 1-diethylcarbamyl-4-sulfanilylpiperazine.

6. A method of preparing 1-diethylthiocarbamyl-4-sulfanilylpiperazine which comprises admixing N-acetylsulfanilyl chloride with 1-diethylthiocarbamylpiperazine at a temperature within the range 0° C. to 30° C. in an aqueous acetone solvent and thereafter hydrolyzing the product and recovering said 1-diethylthiocarbamyl-4-sulfanilylpiperazine.

SAMUEL KUSHNER.
VICTOR K. SMITH, Jr.

REFERENCES CITED

The following references are of record in the file of this patent:

UNITED STATES PATENTS

| Number | Name | Date |
|---|---|---|
| 2,403,776 | Winnek | July 9, 1946 |
| 2,436,685 | Baltzly et al. | Feb. 24, 1948 |

OTHER REFERENCES

Adams et al.: Jour. Amer. Chem. Soc., vol. 61 (1939), pp. 2346–2349.

Dewar et al.: J. Chem. Soc. (London), (1945), page 115.

Krems et al.: Chem. Review, vol. 40 (1947), page 345.